United States Patent
Saxe

(10) Patent No.: US 6,529,312 B1
(45) Date of Patent: *Mar. 4, 2003

(54) ANISOMETRICALLY SHAPED CARBON AND/OR GRAPHITE PARTICLES, LIQUID SUSPENSIONS AND FILMS THEREOF AND LIGHT VALVES COMPRISING SAME

(75) Inventor: Robert L. Saxe, New York, NY (US)

(73) Assignee: Research Frontiers Incorporated, Woodbury, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/327,760

(22) Filed: Jun. 7, 1999

(51) Int. Cl.$^7$ .............................................. G02B 26/00
(52) U.S. Cl. ...................................................... 359/296
(58) Field of Search ................................. 359/245, 290, 359/296; 252/585

(56) References Cited

U.S. PATENT DOCUMENTS

| | | | |
|---|---|---|---|
| 1,963,496 A | 6/1934 | Land | 88/61 |
| 2,041,138 A | 5/1936 | Land | 18/57 |
| 2,178,996 A | 11/1939 | Land | 252/6 |
| 4,164,365 A | 8/1979 | Saxe | 350/362 |
| 4,247,175 A | 1/1981 | Saxe | 350/362 |
| 4,273,422 A | 6/1981 | Saxe | 350/362 |
| 4,407,565 A | 10/1983 | Saxe | 350/374 |
| 4,663,230 A * | 5/1987 | Tennent | 428/367 |
| 4,877,313 A | 10/1989 | Saxe et al. | 350/391 |
| 5,002,701 A | 3/1991 | Saxe | 252/586 |
| 5,093,041 A | 3/1992 | Check, III et al. | 252/585 |
| 5,124,075 A * | 6/1992 | Yashuda et al. | 252/511 |
| 5,279,773 A | 1/1994 | Saxe | 252/585 |
| 5,409,734 A | 4/1995 | Lee et al. | 427/163.1 |
| 5,463,491 A | 10/1995 | Check, III | 359/296 |
| 5,463,492 A | 10/1995 | Check, III | 359/296 |
| 5,516,463 A | 5/1996 | Check, III et al. | 252/585 |
| 5,650,872 A * | 7/1997 | Saxe et al. | 359/296 |
| 5,707,916 A * | 1/1998 | Snyder et al. | 502/180 |
| 5,728,251 A * | 3/1998 | Check, III | 156/307 |
| 6,114,405 A * | 9/2000 | Zhuang et al. | 522/99 |

FOREIGN PATENT DOCUMENTS

EP    0123456 A2 * 1/2000 .................. 100/100

* cited by examiner

Primary Examiner—Ricky Mack
(74) Attorney, Agent, or Firm—Cooper & Dunham LLP

(57) ABSTRACT

The invention contemplates anisometrically shaped carbon-containing particles for use as the particles of a liquid light valve suspension, films and light valves. The anisometric carbon-containing particles are crystalline or amorphous particles and can have various geometrical shapes including, for example, fibrils. The above object is achieved by carefully controlling the size and shape of such particles.

20 Claims, 2 Drawing Sheets

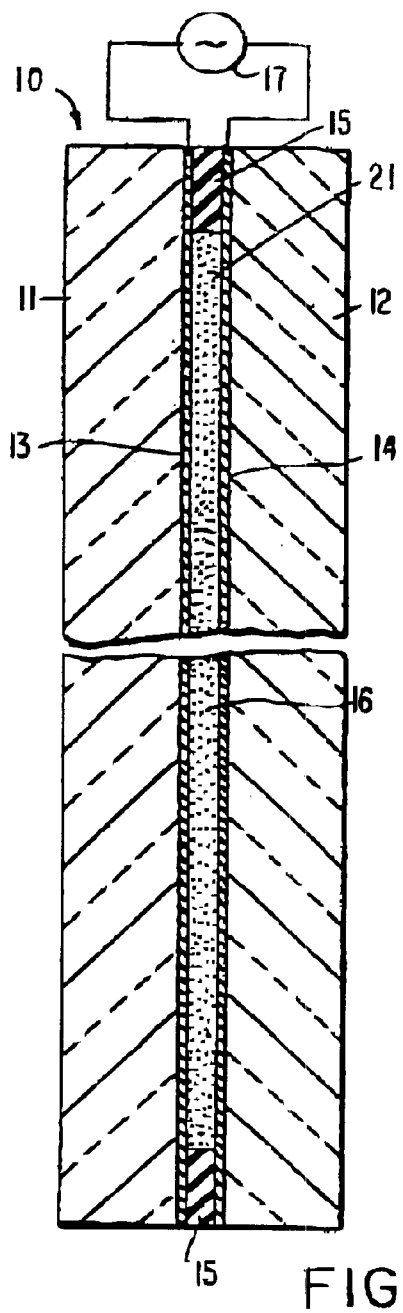
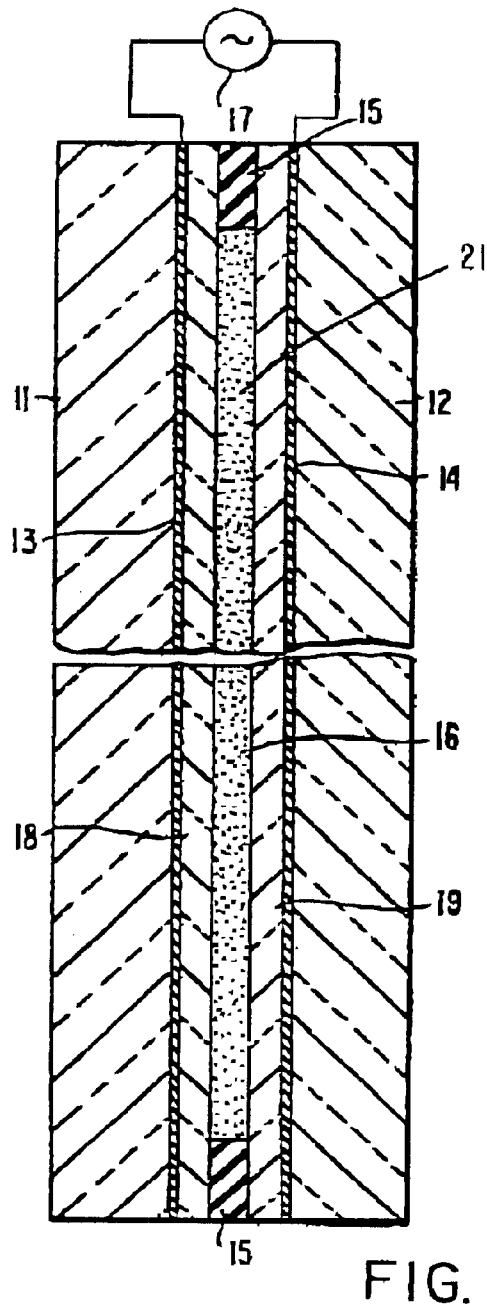
FIG. 1     FIG. 2
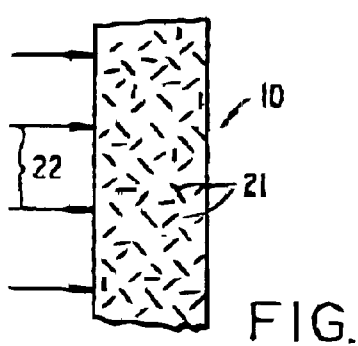
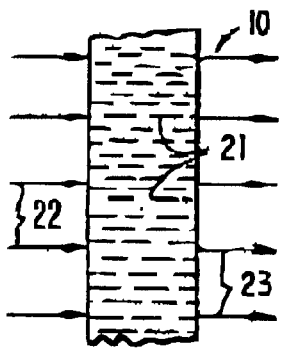
FIG. 3     FIG. 4

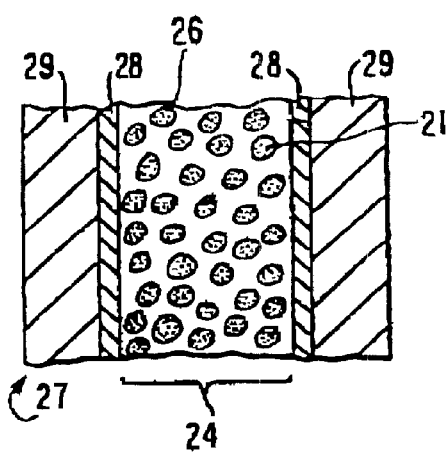 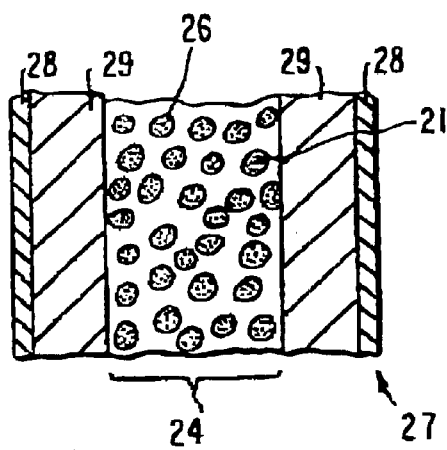
FIG. 5　　　　　FIG. 6
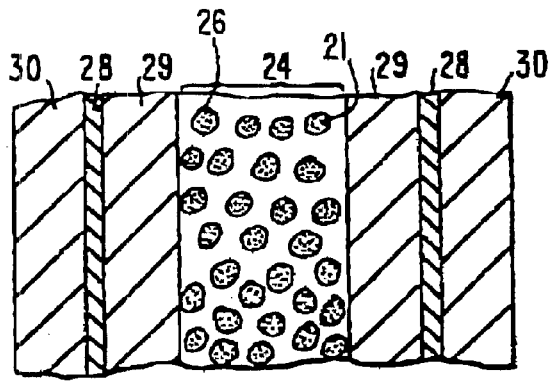
FIG. 7
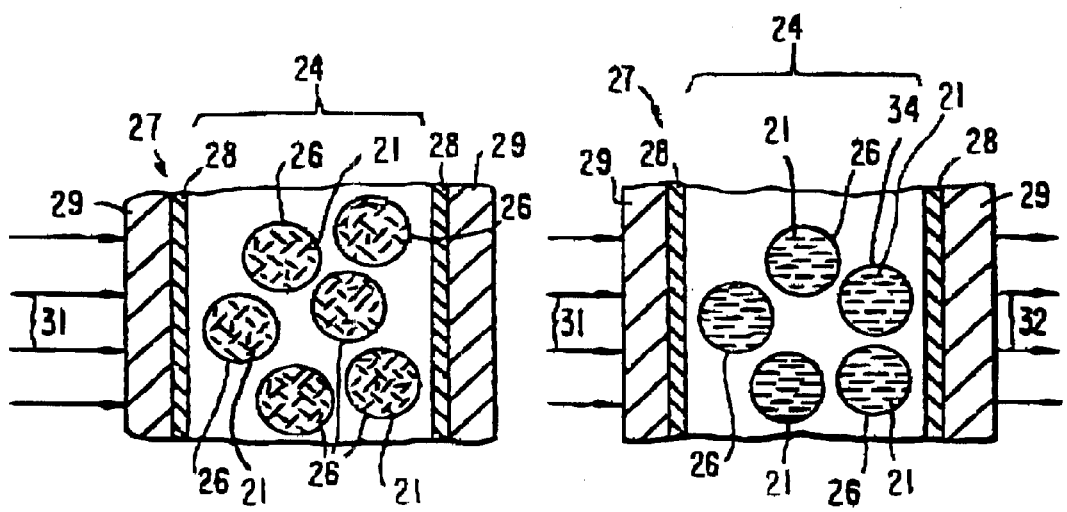
FIG. 8A　　　　　FIG. 8B

ANISOMETRICALLY SHAPED CARBON AND/OR GRAPHITE PARTICLES, LIQUID SUSPENSIONS AND FILMS THEREOF AND LIGHT VALVES COMPRISING SAME

FIELD OF INVENTION

The present invention relates to particles of improved stability comprising anisometrically shaped carbon and/or graphite particles for use in light valves and in light valve suspensions.

BACKGROUND

Light valves have been known for over sixty years for modulation of light. As used herein, a light valve may be described as a cell formed of two walls that are spaced apart by a small distance, at least one wall being transparent, the walls having electrodes thereon usually in the form of transparent conductive coatings. The cell contains a light-modulating element, which may be either a liquid suspension of particles or a plastic film in which droplets of a liquid suspension of particles are distributed and encapsulated.

The liquid suspension (sometimes herein referred to as "a liquid light valve suspension") comprises small particles suspended in a liquid suspending medium. In the absence of an applied electrical field, the particles in the liquid suspension exhibit random Brownian movement, and hence a beam of light passing into the cell is reflected, transmitted or absorbed, depending upon the cell structure, the nature and concentration of the particles and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state.

Use of light valves have been proposed for numerous applications including e.g., alpha-numeric displays, television displays, windows, sunroofs, sunvisors, mirrors, eyeglasses and the like to control the amount of light passing therethrough. Light valves of the type described herein are also known as "suspended particle devices" or SPDs".

For many applications, it is preferable for the activatable material, i.e. the light modulating element, to be a plastic film rather than a liquid suspension. For example, in a light valve used as a variable light transmission window, a plastic film, in which droplets of liquid suspension are distributed, is preferable to a liquid suspension alone because hydrostatic pressure effects e.g., bulging associated with a high column of liquid suspension can be avoided through use of a film, and the risk of possible leakage can also be avoided. Another advantage of using a plastic film is that, in a plastic film, the particles are generally present only within very small droplets and, hence, do not noticeably agglomerate when the film is repeatedly activated with a voltage.

A "light valve film" as used herein refers to a film having droplets of a liquid suspension of particles distributed in the film.

U.S. Pat. No. 5,409,734 exemplifies a type of light valve film that is made by phase separation from a homogeneous solution. Light valve films made by cross-linking emulsions are also known. See U.S. Pat. Nos. 5,463,491 and 5,463,492 both of which are assigned to the assignee of the present invention. All of the above patents including any other patents and references cited therein or elsewhere herein are incorporated into this application by reference thereto.

For use in set suspensions such as light-polarizing sheets, sometimes called "sheet polarizers", which can be cut up and formed into polarized sunglass lenses or used as filters, light-polarizing particles can be dispersed or distributed throughout a sheet of suitable film-forming material, such as cellulose acetate or polyvinyl alcohol or the like. Methods of making set suspensions for use in sheet polarizers are well known in the prior art. It is important to note, however, that the light polarizing particles mentioned above are immovable, i.e., fixed. See e.g., U.S. Pat. Nos. 2,178,996 and 2,041,138.

The Liquid Light Valve Suspension

1. Liquid Suspending Media and Stabilizers.

A liquid light valve suspension may be any liquid light valve suspension known in the art and may be formulated according to techniques known to one skilled in the art. The term "liquid light valve suspension" as used herein means a "liquid suspending medium" in which a plurality of small particles are dispersed. The "liquid suspending medium" comprises one or more non-aqueous, electrically resistive liquids in which there is preferably dissolved at least one type of polymeric stabilizer which acts to reduce the tendency of the particles to agglomerate and to keep them dispersed and in suspension.

The liquid light valve suspension useful in the present invention may include any of the liquid suspending media previously proposed for use in light valves for suspending the particles. Liquid suspending media known in the art which are useful herein, include but are not limited to the liquid suspending media disclosed in U.S. Pat. Nos. 4,247, 175 and 4,407,565. In general one or both of the liquid suspending medium or the polymeric stabilizer dissolved therein is chosen so as to maintain the suspended particles in gravitational equilibrium.

The polymeric stabilizer when employed, can be a single type of solid polymer that bonds to the surface of the particles but also dissolves in the non-aqueous liquid or liquids of the liquid suspending medium. Alternatively, there may be two or more solid polymeric stabilizers serving as a polymeric stabilizer system. For example, the particles can be coated with a first type of solid polymeric stabilizer such as nitrocellulose which, in effect, provides a plain surface coating for the particles and one or more additional types of solid polymeric stabilizer that bond to or associate with the first type of solid polymeric stabilizer and also dissolve in the liquid suspending medium to provide dispersion and steric protection for the particles. Also, liquid polymeric stabilizers may be used to advantage, especially in SPD light valve films, as described in U.S. Pat. No. 5,463,492.

2. Particles.

Inorganic and organic particles may be used in a light valve suspension, and such particles may be either light-absorbing or light-reflecting.

Conventional SPD light valves have generally employed polyhalide particles of colloidal size, that is the particles generally have a largest dimension averaging about 1 micron or less. Preferably, most polyhalide particles have their largest dimension less than one-half of the wavelength of blue light i.e., 2000 Angstroms or less to keep light scatter extremely low.

A detailed review of prior art polyhalide particles can be found in "The Optical Properties and Structure of Polyiodides" by D. A. Godina and G. P. Faerman published in The Journal of General Chemistry, U.S.S.R. Vol. 20, pp. 1005–1016, (1950).

Herapathite, for example, is defined as a quinine bisulfate polyiodide, and its formula is given under the heading "quinine iodosulfate" as $4C_{20}H_{24}N_2O_2 \cdot 3H_2SO_4 \cdot 2HI \cdot I_4 \cdot 6H_2O$ in The Merck Index, $10^{th}$ Ed. (Merck & Co., Inc., Rahway, N.J.). In polyiodide compounds, the iodide anion is thought to form chains and the compounds are strong light polarizers. See U.S. Pat. No. 4,877,313 and Teitelbaun et al. JACS 100 (1978), pp. 3215–3217. The term "polyhalide" is used herein to mean a compound such as a polyiodide, but wherein at least some of the iodide anion may be replaced by another halide anion. More recently, improved polyhalide particles for use in light Valves have been proposed in U.S. Pat. Nos. 4,877,313, 5,002,701, 5,093,041 and 5,516,463. These "polyhalide particles" are formed by reacting organic compounds, usually containing nitrogen, with elemental iodine and a hydrohalide acid or an ammonium or alkali metal halide or alkaline earth metal halide. Such organic compounds are referred to herein as a "Precursor."

However, for the particles to be commercially useful, it is necessary that the particles used in a liquid light valve suspension, whether or not incorporated into a film, have great chemical and environmental stability. To obtain particles of great environmental stability, in turn, it may be desirable to use non-polyhalide particles in light valve suspensions and films, especially where the stability of the material composing the particles is known to be excellent.

The use of graphite particles in light valves was first proposed in U.S. Pat. No. 1,963,496. However, an attending disadvantage of employing conventional graphite particles in light valve suspensions or films is that graphite particles are prone to rapidly agglomerate when a light valve suspension of them is activated. In addition, prior art graphite particles are also known to scatter an unacceptably large amount of light as well as settling due to the gravitational pull.

Many kinds of known pigments are used as colorants in paints, varnishes and inks. Generally, such pigments have average particle sizes in the range of 0.1 to 10 microns, but usually 1 micron or greater. To obtain these small sized particles, mechanical devices are often used to comminute solid particles into smaller ones. Ball mills, attritors, and bead mills and roll mills are commonly used for such purposes.

The use in a light valve suspension of particles produced by such mechanical methods is not practical, however, for several important reasons. First, the particles are usually too large, generally having an average size (diameter) of 1 micron or greater. Secondly, even if sub-micron sized particles are produced, the grinding and comminution process tends to make such particles spherical in shape or amorphous, reducing or virtually eliminating their aspect ratio. For use in a light valve suspension anisometrically shaped particles are important; hence, particles shaped like needles, rods or plates and the like are preferred and generally necessary because their anisometric shape facilitates orientation in an electric or magnetic field. Thirdly, an inherent disadvantage of mechanical comminution is that there is a large distribution of sizes, generally resulting in the presence of particles having a size of 1 micron or more even if the average particle size is less than 1 micron. Particles larger than 0.2 micron (one-half the wavelength of blue light) tend to scatter light, and such scattering increases exponentially with particle size. This fact and the fact that relatively large particles promote agglomeration are additional reasons why such comminuted particles are not desirable for use in a light valve suspension. There is thus a need in the art for light valves containing a light valve suspension of ultrafine particles.

Moreover, while various types of particles have been suggested in the prior art for use in light valves, heretofore it has not been practical to obtain particles of a submicron size and anisometric shape and good optical properties, except for polyiodide particles. However, in some cases polyiodide particles may not be sufficiently stable to ultraviolet radiation, and light valve suspensions of such polyiodide particles may degrade in terms of color and performance if exposed to intense ultraviolet radiation for a prolonged period of time unless special measures are taken to protect against UV radiation such as, including, UV absorbers in the light valve suspension or film or using a UV filter to intercept UV radiation before it strikes the SPD. Also, nearly all polyiodide particles are limited to a blue color, whereas it is also desirable to have light valve suspensions which have off-state colors which are not blue. Accordingly, new types of particles for light valve suspensions are needed which will be suitably small and anisometrically shaped, which will tolerate high levels of ultraviolet radiation for long periods of time without significant degradation and/or which have a variety of off-state colors.

U.S. Pat. No. 5,650,872 provides an electro-optical device, such as a light valve or electrophoretic display, comprising a cell formed of opposed cell walls, a light-modulating unit comprising a suspension containing anisometric particles suspended in a liquid suspending medium between said cell walls, and opposed electrode means operatively associated with said cell walls for applying an electrical field across said suspension, the anisometric particles having an average particle size of about 0.2 microns or less, preferably about 0.1 micron or less.

In another embodiment disclosed in U.S. Pat. No. 5,650,872, a light valve is provided comprising a cell formed of opposed cell walls, a light-modulating unit comprising a liquid light valve suspension containing ansometric particles suspended in a liquid suspending medium between said cell walls, and opposed electrode means operatively associated with said cell walls for applying an electrical field across said suspension, said anisometric particles having been prepared by the Evaporative Dispersion Process, and said liquid light valve suspension being capable of decreasing the transmission of light therethrough when an electrical field is applied across said suspension.

The liquid light-modulating suspensions used in U.S. Pat. No. 5,650,872 have a wide array of off-state colors and can include materials superior to polyiodide particles in terms of their ability to tolerate high levels of ultraviolet radiation for long periods of time without serious degradation. However, all of the particles made in accordance with U.S. Pat. No. 5,650,872 must be made with the evaporative dispersion, and this process has not been shown to form sufficiently small anisometrically shaped carbon or graphite.

The present invention attempts to overcome the disadvantages of using conventional carbon and/or graphite particles in light valve suspensions, the achievement of which becomes apparent from the discussion appearing below.

BRIEF DESCRIPTION OF THE DRAWINGS

FIG. 1 is a cross-sectional view of an ohmic type light valve according to the present invention;

FIG. 2 is a cross-sectional view of a capacitive type light valve according to the present invention;

FIG. 3 illustrates the closed, inactivated, dark, or off state of a light valve according to the present invention;

FIG. 4 illustrates the open, activated, light-transmitting, or on state of a light valve according to the present invention;

FIG. 5 is a fragmentary, cross-sectional schematic illustration of a film type light valve of the present invention;

FIG. 6 is a fragmentary, cross-sectional schematic illustration of a film type light valve of the present invention having external electrodes;

FIG. 7 is a fragmentary, cross-sectional schematic illustration of a film type light valve of the present invention having protected external electrodes; and FIGS. 8A and 8B illustrate the closed and open states of a film type light valve of the present invention.

DESCRIPTION OF THE INVENTION

The present invention is based on the discovery that suitably sized anisometric carbon and/or graphite particles can be produced and used as the particles of a liquid light valve suspension, films and light valves. The particles used in the instant light valves can be in various geometric forms. The particular geometric form is not critical as long as the particles are anisometric. A non-limiting example of anisometic particles includes fibrils.

Carbon fibrils are essentially cylindrical discrete carbon particles characterized by a substantially constant average diameter ranging from about 3.0 to about 66 nanometers, an average length of at least about three times the diameter and the lengths of the fibrils averaging less than about 200 nanometers. Preferably, the carbon fibrils include at least an outer region of multiple, essentially continuous, layers of ordered carbon atoms disposed substantially concentrically about the cylindrical axis of the fibril. As well, it is preferred that the entire fibril be substantially free of thermal carbon overcoat. The term "carbon fibrils" as used herein means carbon and/or graphite filaments having average lengths of about 200 nanometers or less.

Although the present invention comprises both amorphous carbon and crystalline carbon (graphite) particles, graphite particles are preferred because of their generally higher electrical conductivity for a given size particle. Accordingly, the anisometric particles useful in the present invention comprise anisometric particles, which are composed entirely of amorphous carbon, or entirely of graphite, or may have a discrete core, which may be hollow or composed of amorphous carbon overlain by a layer or layers of graphite. If the anisometric particle, such as for example, a fibril, has a distinct core, the wall thickness of the particle or fibril is about 0.1 to 0.4 times the external diameter of the particle or fibril.

Methods of making carbon fibrils are known in the art. For example, see U.S. Pat. No. 4,663,230, which is incorporated in its entirety by reference herein.

Methods of dispersing carbon and/or graphite particles, such as fibrils in liquids are known in the art. Generally, a polymer soluble in the liquid of the dispersion will bond to and disperse the carbon particles of the present invention if the polymer has in its structure a sufficient number of low polarity or non-polar groups. Non-limiting examples of low or non-polar groups include alkyl and aryl hydrocarbon groups and high polarity groups include groups such as, ionomer, hydroxyl, carboxyl or alkylene oxide such as ethylene oxide. Surfactants and dispersants for carbon particles are known in the art. See, also U.S. Pat. Nos. 4,164,365, 4,273,422 and 5,279,773, which are assigned to the assignee of the present invention, and describe suitable copolymers and polymeric dispersion systems for light valve suspensions.

As a practical matter, carbon fibrils cannot be easily made with diameters less than about 3.0 nanometers. In order to keep light scatter very low in a light valve suspension, the fibrils' lengths should average less than about 200 nanometers (one-half the wavelength of blue light). Preferably, no more than five percent of the particles in a suspension of the invention will have lengths of 200 nanometers or more; more preferably one percent or less of the particles will have lengths of 200 nanometers or more; and most preferably, 0.2% or less of the particles will have lengths of 200 nanometers or more.

On the other hand, if the particles, such as fibrils, have too small a length, a different problem arises. A suspension of very small length particles requires a relatively great amount of voltage to orient, whereas longer particles require less voltage because of their greater torque. Hence, as a practical matter, the particles should preferably have an average length of about 50 nanometers or more. A suspension of anisometric carbon particles should preferably have five percent or less of its particles with lengths less than 50 nanometers; more preferably one percent or less of its particles will have lengths less than 50 nanometers; and most preferably 0.2% or fewer of its particles will have lengths less than 50 nanometers.

Useful in the instant invention are carbon and/or graphite particles which are prepared in a manner such that anisometric materials having an aspect ratio, i.e., the ratio of length to width, of about 3:1 or greater, preferably about 10:1 or greater or more preferably of about 20:1 or greater are obtained. It is preferred that the particles have a thickness which is substantially smaller than the length or width of the particle.

The particles useful in the present invention should be dimensioned such that the largest possible dimension is an average of 200 nanometers or less. Preferably, the largest average possible dimension should range from about 50 to 200 nanometers, more preferably an average of from about 75 to about 180 nanometers.

Although comminution is generally harmful because it reduces the aspect ratio of the particles being comminuted, a comminution process may be used if two of the three spatial dimensions of the particles are extremely small. For example, if cylindrically shaped fibrils have a very small average diameter. e.g., 10 nanometers and an average length of 1 micron or more, the fibrils could be comminuted by methods known in the prior art to have average lengths below 200 nanometers, without significantly affecting the particles' diameters.

Particles of different sizes or size ranges may be separated from one another by known methods such as filtration and centrifugation.

The chirality of deposition determines whether tubes are metallic or semi-conductive. Carbon nanotubes can be metallic or semi-conductive depending on their chirality.

A dispersion of the carbon particles of the present invention may be easily prepared by rapidly mixing the anisometric particles such as fibrils into any suitable light valve liquid e.g. isopentyl acetate or tri-pentyl trimellitate in the presence of any suitable polymer which acts as a dispersant, such as those described in the prior art.

When a dispersion of the anisometric carbon particles such as fibrils is placed in a light valve and activated with an AC voltage, light transmission through the cell is observed to increase readily.

Light valves of the invention and the functioning of such light valves are generally illustrated in FIGS. 1 to 8. In FIG. 1, a light valve generally indicated as 10 is formed of two glass plates 11 and 12 having transparent conductive coatings 13 and 14 on the inner surfaces thereof. The conductive coatings 13, 14 form area electrodes for the application of energizing voltage to the cell 10. The glass plates 11, 12 are separated by a spacer 15 sealed to the glass plates 11, 12 around the edges thereof to provide a chamber 16 between glass plates 11, 12 in which the light valve suspension of carbon fibrils 21 is placed. Once the light valve suspension has been introduced, the cell 10 is sealed. The conductive coatings 13 and 14 are connected to an AC power supply 17. In as much as the light valve suspension in chamber 16 is in contact with conductive coatings 13 and 14 this may be termed an ohmic type cell.

FIG. 2 is similar to FIG. 1 and corresponding parts are similarly designated. However, in FIG. 2 thin transparent substantially nonconductive coatings 18 and 19, for example silicon monoxide, silicon dioxide, aluminum oxide, titanium dioxide or polyimide, are placed over the area electrodes 13 and 14 so that the conductive coatings are protected from the light valve suspension. Since layers 18 and 19 are of dielectric material, the electrodes are, in effect, capacitively coupled to the fluid suspension in chamber 16.

FIG. 3 schematically shows the closed OFF or dark condition of the cell 10. The carbon fibrils 21 are illustrated in random orientation. A beam of light impinging on cell 10, indicated by arrows 22, is absorbed, and if a sufficient concentration of carbon fibrils 21 is present in the suspension the cell will appear substantially opaque.

FIG. 4 schematically shows the open ON or light transmitting condition of the cell 10. Here, due to the application of an electric field, the carbon fibrils 21 are aligned with their major axes perpendicular to the wall faces. In this condition, the carbon fibrils intercept much less light than in the random state shown in FIG. 3. Consequently, a considerable portion of the beam of light 22 passes through the cell, as indicated by the arrows 23.

FIG. 5 shows a light valve 27 that includes a film 24, comprising a cross-linked polymeric matrix material in the form of a transparent plastic 25 in which a plurality of dark droplets of liquid light valve suspension 26 containing the carbon fibrils 21 is distributed. The globules are dark because the carbon fibrils 21 within them are strongly light absorbing. The light valve 27 has a protective layer 29 and an electrode 28 placed on both sides of the film 24. In this embodiment the electrodes 28 are on the inner surfaces of the protective layers 29 and in contact with the film 24. Dielectric overcoatings (not shown) may also be placed over the electrodes if desired. The protective layers 29 and electrodes 28 in this embodiment are permanently secured to the film 24.

FIG. 6 illustrates another embodiment of the light valve 27 in which protective layers 29, which have an electrode 28 on one side of each protective layer, are again placed on both sides of the film 24. However, unlike the embodiment shown in FIG. 5, in this embodiment the electrodes are on the outer surfaces of the protective layers 29, and are not in contact with the film 24. Again, the protective layers and electrodes in this embodiment are permanently secured to the film. Thus, in FIG. 5, the electrodes 28 may be coated over the film 24 using known techniques for coating electrodes on glass cell walls, while protective layers 29 may be coated over the electrodes 28, also using known techniques. In FIG. 6, the relationship of electrodes 28 and protective layers 29 is reversed.

FIG. 7 shows a film 24 having protective layers 29 secured thereto. In this embodiment the film 24 is enclosed within hard rigid substrates 30. Electrodes 28 may be carried by the substrates 30 and face the protective layers 29. It is presently preferred that the electrode 28 and protective layer 29 be in the form of a prefabricated assembly. In this embodiment, the electrode 28 and protective layer 29 shown in FIGS. 5 to 7 can be provided by a film 29, such as a plastic film that has been coated with an electrode 28 before application of the assembly to the film 24. The hard rigid substrates 30 can be transparent materials, such as glass or plastic, such as polyethylene terephthalate or polycarbonate. For many applications of a light valve such as variable transmission windows, filters and eyewear, and backlit displays, it is desirable that both substrates be transparent. For such use in the present invention, the electrodes should also be made of transparent material, e.g., thin layers of tin oxide, indium tin oxide or of conductive metals such as gold. For other applications such as mirrors and reflective displays it may only be desirable for one substrate and the electrode deposited thereon to be transparent, whereas the second substrate and/or electrode deposited on it can be made of specularly reflective material such as metal. The second substrate may also be made of a ceramic material with a transparent or reflective electrode thereon. Where diffuse rather than specular reflection is desired as in certain types of displays, the rear electrodes can be overcoated with a diffuse white layer by any of various methods known in the art. See, for example U.S. Pat. Nos. 4,643,525 and 4,648,691.

In FIG. 8A a beam of light 31 impinges on a film in a light valve of the present invention. It is assumed that no potential difference, i.e., electric field, exists between the electrodes 28. Hence, the carbon fibrils 21 dispersed within the micro-droplets 26 of the liquid suspension are in random positions due to Brownian Movement. Because the carbon fibrils 21 absorb light, a beam of light 31 impinging on the film is absorbed by carbon fibrils 21 within the micro-droplets 26. FIG. 8B assumes that an electric field (not shown) exists between the electrodes 28. As a result the carbon fibrils 21 align within the micro-droplets 26 and a considerable portion of the beam of light 31 passes through the film as indicated by the arrows 32.

It is to be understood that the present invention is not limited in scope by the exemplified embodiments which are intended as illustrations of single aspects of the invention, and embodiments and methods which are functionally equivalent are within the scope of the invention. Indeed, various modifications of the invention in addition to those described herein will become apparent to those skilled in the art from the foregoing description.

What is claimed is:

1. An electro-optical device, comprising a cell formed of opposed cell walls, a light-modulating unit comprising a suspension containing anisometrically shaped carbon fibrils suspended in a liquid suspending medium between said cell walls, and opposed electrode means operatively associated with said cell walls for applying an electrical field across said suspension, said anisometrically shaped carbon fibrils having an average length of less than 200 nanometers and a diameter of at least 3 nanometers, wherein the length is at least three times the diameter.

2. The device according to claim 1, wherein said electro-optical device is a light valve and said suspension is a light valve suspension.

3. The device according to claim 2, wherein said anisometrically shaped carbon fibrils range between 50 and 200 nanometers in length.

4. The device according to claim 2, wherein said anisometrically shaped carbon fibrils range between 75 and 180 nanometers in length.

5. The device according to claim 2, wherein said light valve suspension is a liquid suspension or a film.

6. The device according to claim 2, wherein the anisometrically shaped carbon fibrils are amorphous or crystalline carbon.

7. The device according to claim 6, wherein the anisometrically shaped carbon fibrils have an outer region of multiple, continuous layers of ordered carbon atoms.

8. The device according to claim 7, wherein the carbon fibrils range between 3.0 and 60 nanometers in diameter.

9. A light valve comprising a cell containing a particle suspension, said suspension adapted to serve as a light-modulating element of the light valve, said suspension comprising anisometrically shaped carbon-containing fibrils suspended in a liquid suspending medium, wherein the anisometrically shaped carbon-containing fibrils have an average length of less than 200 nanometers and a diameter of at least 3 nanometers, wherein the length is at least three times the diameter.

10. The light valve of claim 9, wherein said anisometrically shaped carbon fibrils range between 50 and 200 nanometers in length.

11. The light valve of claim 9, wherein said anisometrically shaped carbon fibrils range between 75 and 180 nanometers in length.

12. The light valve of claim 9, wherein the anisometrically shaped carbon fibrils are amorphous or crystalline carbon.

13. The light valve of claim 9, wherein the anisometrically shaped carbon fibrils have an outer region of multiple, continuous layers of ordered carbon atoms.

14. The light valve of claim 9, wherein the anisometrically shaped carbon fibrils range between 3.0 and 60 nanometers in diameter.

15. A light valve comprising a light modulating unit comprising a plurality of anisometrically shaped carbon fibrils in a liquid suspending medium, said fibrils having an average length of less than 200 nanometers and a diameter of at least 3 nanometers, wherein the length is at least three times the diameter.

16. The light valve of claim 15, wherein said anisometrically shaped carbon fibrils range between 50 and 200 nanometers in length.

17. The light valve of claim 15, wherein said anisometrically shaped carbon fibrils range between 75 and 180 nanometers in length.

18. The light valve of claim 15, wherein the anisometrically shaped carbon fibrils are amorphous or crystalline carbon.

19. The light valve of claim 15, wherein the anisometrically shaped carbon fibrils have an outer region of multiple, continuous layers of ordered carbon atoms.

20. The light valve of claim 15, wherein the anisometrically shaped carbon fibrils range between 3.0 and 60 nanometers in diameter.

* * * * *